United States Patent [19]

Petrunich

[11] 4,230,355
[45] Oct. 28, 1980

[54] TRAPPERS TOOL AND METHOD OF USE

[76] Inventor: Raymond W. Petrunich, 1121 Sloan St., Scranton, Pa. 18504

[21] Appl. No.: 74,925

[22] Filed: Sep. 13, 1979

[51] Int. Cl.³ .............................................. B25B 27/00
[52] U.S. Cl. ...................................... 294/15; 81/3 R; 43/96
[58] Field of Search ................... 294/15, 1 R; 81/3 R; 43/96, 97

[56] References Cited

U.S. PATENT DOCUMENTS

| | | | |
|---|---|---|---|
| 1,238,679 | 8/1913 | Jacob | 43/97 |
| 1,888,200 | 11/1932 | Olson | 43/97 |

OTHER PUBLICATIONS

Arnold's Professional Fox Trapping, by Walter L. Arnold, Chapter 1, p. 5.
Hawbaker's Supreme Fox & Coyote Trapping Method, by S. Stanley Hawbaker & Son, copyright 1969, pp. 11, 28, 32, 39.

*Primary Examiner*—James B. Marbert
*Attorney, Agent, or Firm*—Steele, Gould & Fried

[57] ABSTRACT

An apparatus for safely handling an animal trap, said trap having a pan, a trigger dog engaging the pan, and spring-loaded means for holding an animal such as jaws or a noose, the apparatus comprising an enclosure member adapted to overfit the pan and enclose the area beneath the pan, and a handle member having a length greater than the reach of the jaws or other animal holding means.

A method for handling a cocked animal trap, said trap of the type having a pan, a trigger dog engaging the pan, and spring-loaded means for holding an animal such as jaws or a noose, the method comprising the steps of covering the pan, the trigger dog and the space immediately below the pan; securely engaging the frame of the trap; and manipulating the trap by means of a handle member extending beyond the reach of the jaws or other animal holding means.

9 Claims, 8 Drawing Figures

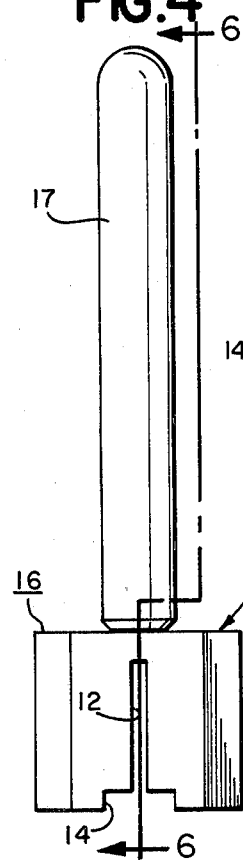
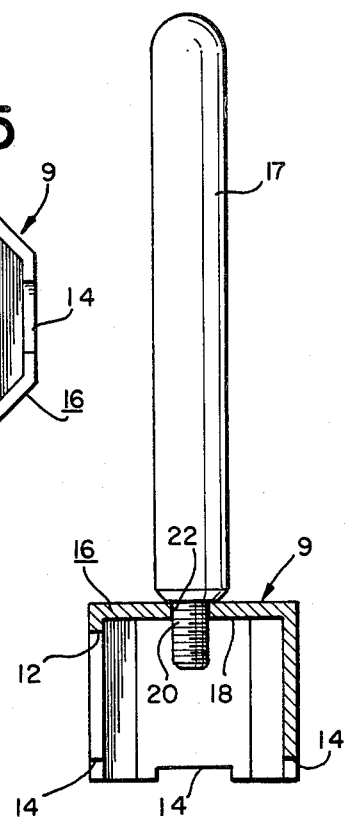
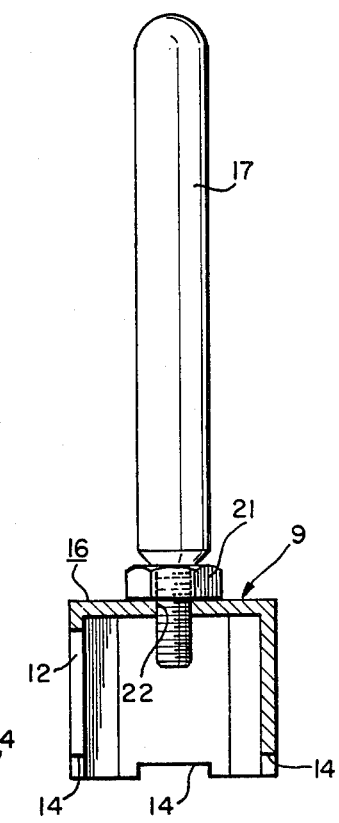
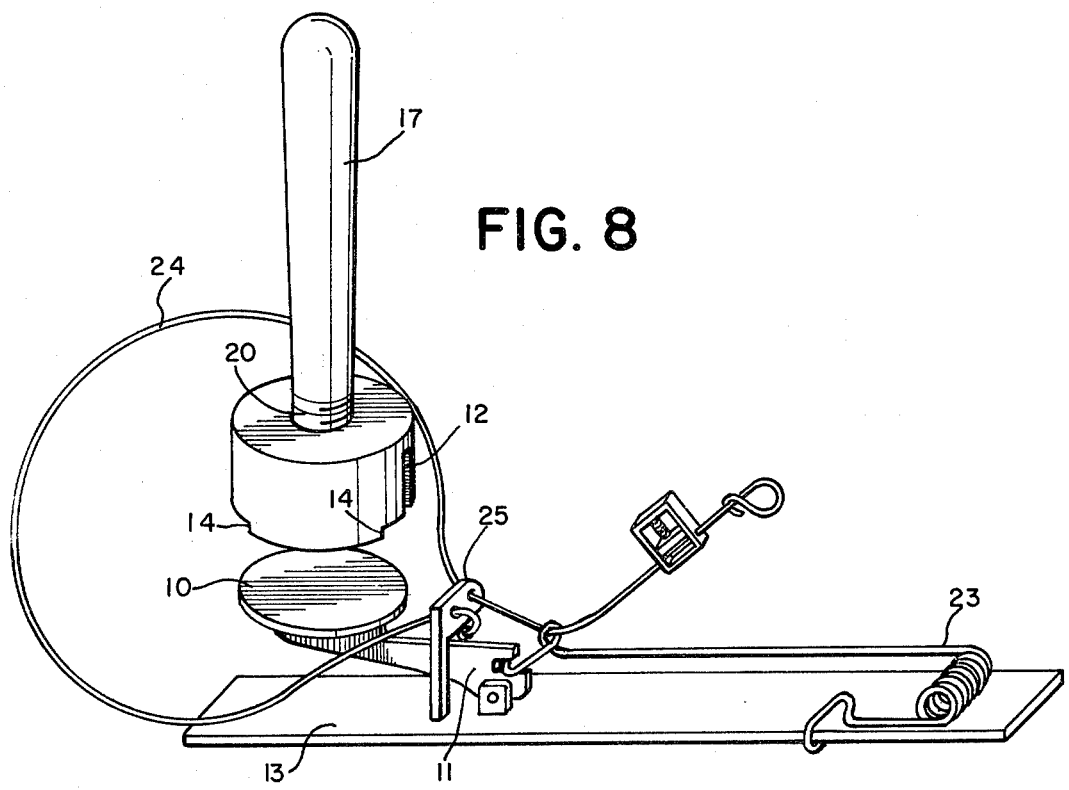

TRAPPERS TOOL AND METHOD OF USE

BACKGROUND OF THE INVENTION

1. Field of the Invention

This invention relates to the field of trapping, and in particular, to a method and apparatus for handling, positioning and adjusting animal traps of the type having spring-loaded means for holding the animal, such as jaws or a noose. The invention provides a safe and effective means for positioning, adjusting, and burying a cocked trap, with minimum contamination by human scent, and minimum degradation of the trap's operation due to accumulation of material under the pan.

2. Description of the Prior Art

In the art of trapping, where the use of spring-loaded, animal-activated traps is concerned, there are three problems which are particularly difficult to deal with, especially at the same time. These problems may be appreciated from a brief description of a typical spring-loaded animal-activated trap. Such a trap typically comprises a frame, on which is mounted a set of spring-loaded jaws, controlled by a trigger mechanism. When the trap is cocked, activation of the jaws is prevented by a trigger dog. The trigger dog is itself controlled by movement of a pivotally mounted pan or plate, which is meant to be contacted by the animal to be trapped. In operation, an animal steps on or otherwise presses the pan downwardly, which releases the trigger dog, which releases the jaws and allows them to close on that part of the animal which acted on the pan. It will be appreciated that after a trap has been cocked, it must be camouflaged in order that an animal will be fooled into unknowingly stepping on it. Such traps are typically camouflaged by burying them in forest debris, such as leaves and sticks and the like. One such problem which stems from the use of such traps is accumulation of the camouflaging material underneath the pan. Any material which inadvertently fills the void under the pan raises the pressure which must be exerted on the pan to release the trigger dog and thereby activate the trap. Inasmuch as traps are literally buried by twisting and turning them, accumulation of debris under the pan has been difficult, if not impossible to prevent. A second problem is contamination of the trap by human scent. It is apparent that the trap must undergo a significant amount of handling by the trapper, and if the human scent is too strong, an animal will be warned off. The third such problem is that as a result of all of the handling which is necessary to cock, bury and camouflage the trap, the trigger mechanism may be accidentally activated, thereby trapping the trapper. Grievous injuries are the result of such accidents.

In the prior art, the problem of accumulation of debris under the trap pan has been dealt with in a varied manner. Some trappers use a flexible cover which protects the void or space immediately below the pan. Although this effectively precludes accumulation of debris under the pan, the cover exerts an upward force against the pan, and therefore increases the weight required to move the trap pan and release the trigger dog. Further, the flexible cover material tends to be absorbent, and is likely to be contaminated by undesirable scents. Other devices developed include rigid guards, cups and trays mounted under the pan as well as fragile enclosures for the entire trap. An enclosure for an entire trap, even if fragile, tends to increase the weight needed to trigger the trap, and although a cup mounted under the pan does not have such an effect, it is a permanent fixture and results in added expense in trap manufacture.

Trappers often deal with the problem of contamination of a trap by human scent by use of rubber gloves while handling traps. Such gloves impede the trapper at a point where manual dexterity is important to his safety and success.

The problem of foreign scents on a trap is sometimes dealt with by sprinkling animal urine or the like on the trap, however, it should be apparent that methods and apparatus which reduce the necessity of touching the trap reduce the risk of contamination.

Tools are known in the art which assist trappers in setting traps. Some of these tools provide the trapper with a mechanical advantage against the trap springs and others allow the trapper to manipulate the trap parts, such as being able to lift the pan from a safe distance while setting the trigger dog. Some tools provide a relatively insecure hold on traps by means of hooks, and some traps are themselves equipped with catches which hold the jaws of the trap open while the trap is being handled. However, each of these prior art tools must be removed or deactivated in order to lay the trap, and all catches must be released. Accordingly, during the most significant part of setting the trap, the known safety features are inoperable.

It can be appreciated then that even though trapping is an ancient art, those skilled in the art have failed to provide satisfactory solutions to the three problems noted above, and in particular, they have failed to provide a satisfactory solution which resolves all of these problems simultaneously. This invention provides a simultaneous solution to all of the noted problems. A tool is provided which has an enclosure member and a handle member. The enclosure member is adapted to be temporarily positioned over the pan, surrounding the space or void immediately below the pan, and preventing the entry of debris while the tool is utilized to twist, turn and bury the trap. The enclosure member is further adapted to overfit the trigger dog and engage members of the frame of the trap in order that secure control be provided. The handle of the tool is sufficiently long to extend beyond the reach of the jaws, so that in the event the jaws are accidentally triggered, no harm will come to the trapper. With regard to scent contamination, use of the methods and apparatus of this invention make it unnecessary for a trapper to directly touch the trap once it has been cocked. The trap can be handled as much as is necessary to bury or camouflage it by use of the tool alone, without fear of injury, with minimal accumulation of debris under the pan and with minimal risk of scent contamination.

This invention provides a solution to yet another problem known in the art. That problem is adjusting the height of the pan after the trap has been set, in order to reduce the triggering weight necessary to activate the trap. This is now accomplished by pushing the pan downwardly, by whatever means are available, so that it must move a smaller distance in order to release the trigger dog. An extension of the handle of this invention may be adjusted to protrude into the enclosure member, and engage the pan. In this fashion, the handle of the tool can be used to position the pan for as little weight as is necessary or desirable.

SUMMARY OF THE INVENTION

It is the object of this invention to provide a safe and convenient means and method of handling, positioning and adjusting an animal trap of the type having spring-loaded means for holding an animal, such as a noose or jaws.

It is also an object of this invention to prevent accumulation of material under the pan of a trap being positioned, thereby improving trap performance by prevention of any upward force against the pan.

It is another object of this invention to prevent false triggering while the cocked trap is being handled, due to material falling on the pan, or by vibration or contact caused by an insecure hold on the trap by the trapper.

It is another object of this invention to avoid contamination of the trap by human scent, while precluding the necessity for bulky rubber gloves or other equipment.

It is still another object of this invention to allow the trapper to safely set the triggering sensitivity of a cocked trap by adjustment of the height of the trap pan.

These and other objects of this invention are accomplished by a tool for handling animal traps having spring-loaded animal-holding means, the tool comprising: an enclosure member adapted to overfit the pan of said trap; and a handle member for said enclosure member, said handle member having a length greater than the span of said jaws. The invention is also embodied wherein said enclosure member is adapted to allow clearance of the triggering dog of the trap by a first slot in said enclosure member; and, said enclosure member is also adapted to fit snugly against the frame of the trap, by at least one additional slot in said enclosure member, conforming with the dimensions of the frame of the trap.

The method of this invention comprises: cocking the trap; covering the pan and trigger dog and the space immediately below said pan; securely engaging the frame of the trap; and, manually manipulating the trap by means of a handle extending beyond the reach of the jaws.

The aforesaid tool may be equipped with at least a partial lining of absorbent material affixed within said enclosure member, for use in a method of handling animal traps and the like wherein the absorbent material is treated with a suitable agent such as animal urine and used as above-described. In addition, the handle member may be made to be removable from the enclosure member for use with additional enclosure members dimensioned to accomodate one or more different kinds of traps; and, said handle member may be made to adjustably protrude into and through said enclosure member to precisely set the height of the trap pan.

BRIEF DESCRIPTION OF THE DRAWINGS

For purposes of illustration of the invention, there are shown in the drawings forms which are presently preferred; it being understood, however, that this invention is not limited to the precise arrangements and instrumentalities shown.

FIG. 4 is a front view of said tool;

FIG. 5 is an end view of said tool;

FIG. 6 is a sectional view of said tool, taken along the line 6—6 in FIG. 4;

FIG. 7 is a sectional view of an additional embodiment of said tool taken along the line 6—6 in FIG. 5, wherein said handle member adjustably protrudes into and through said enclosure member, and may be locked by means of a lock nut; and FIG. 8 is a perspective view of said tool, posed for operation over a noose-type animal trap.

DETAILED DESCRIPTION OF THE DRAWINGS

Figure 1:
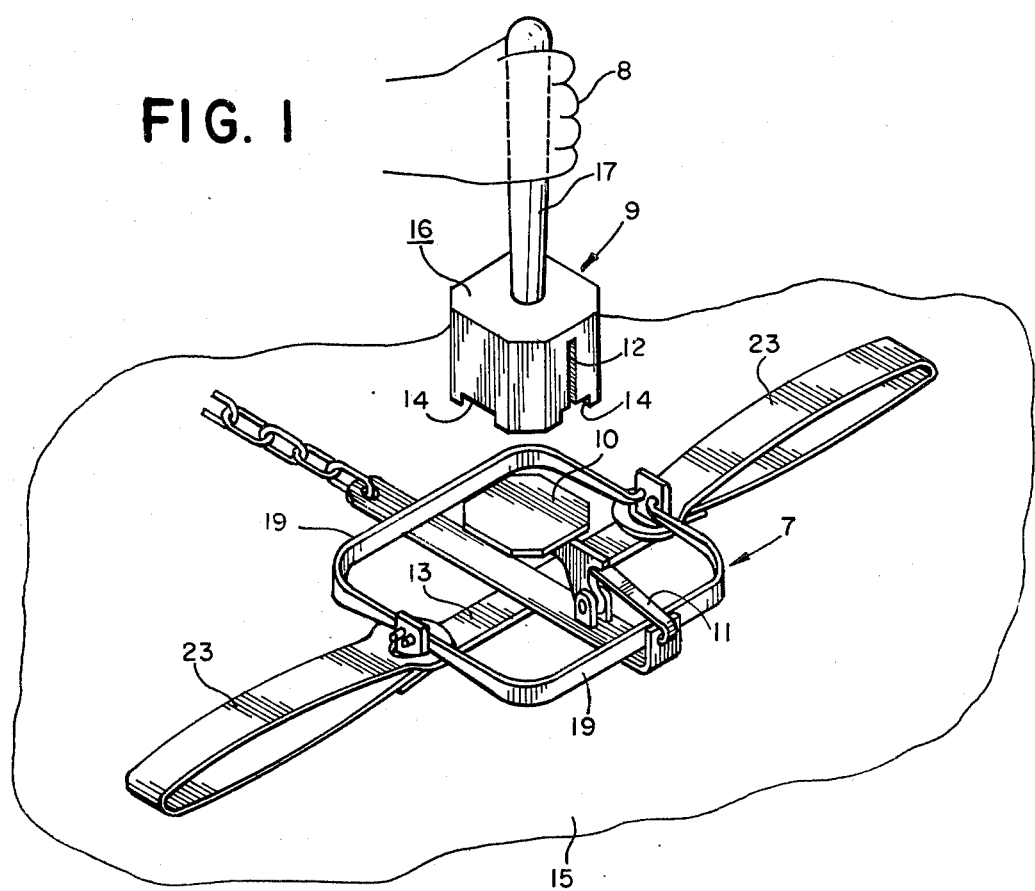
FIG. 1 is a perspective view of the aforesaid tool poised over the cocked trap.
Figure 2:
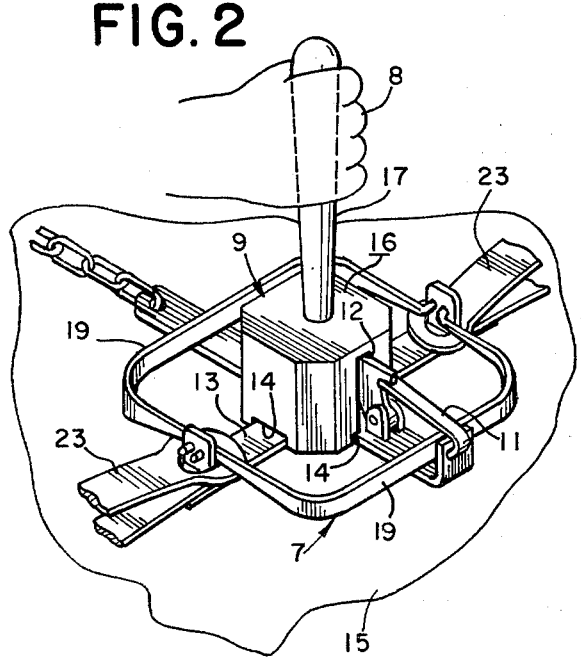
FIG. 2 is a perspective view of said tool in the operative position.
Figure 3:
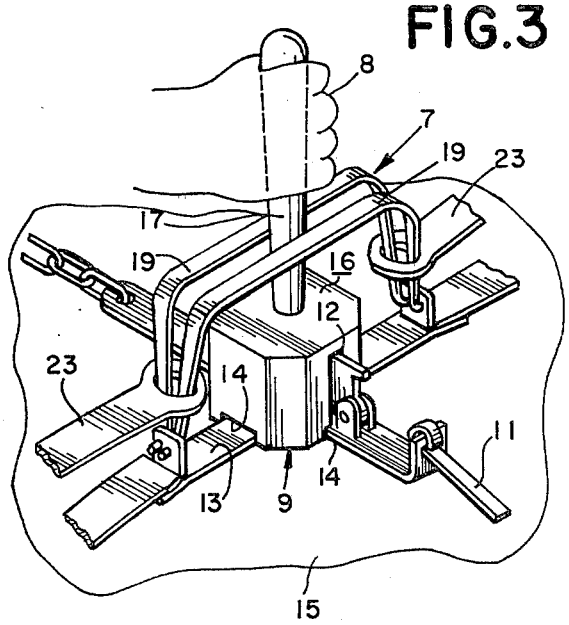
FIG. 3 is a perspective view illustrating the relative positions of hand, tool and trap, should the trap spring while being manipulated.

This invention is intended for use on animal traps and the like. A typical version of such a trap 7 is illustrated in FIGS. 1, 2 and 3. The trap comprises a frame 13 upon which are mounted a pan 10, a triggering dog 11, animal holding means such as jaws 19, and springs 23. In operation, the trap, shown cocked in FIG. 1, is embedded in sand or other bedding material 15. Should an animal contact the pan 10, the downward displacement of said pan causes the release of triggering dog 11 which had theretofore held the jaws 19. The jaws 19 are then forced together by the springs 23.

The tool 9 of this invention, as shown in FIGS. 1 through 8, comprises an enclosure member 16 adapted to overfit the pan 10 and the space immediately below said pan. The invention also comprises a handle member 17 for said enclosure member, said handle member being long enough to allow trapper 8 to grasp tool 9 at a point beyond the reach of the jaws 19. Enclosure member 16 is equipped with a first slot 12 to overfit triggering dog 11, and with at least one additional slot 14 to securely engage frame 13 when the tool is in place.

FIGS. 1, 2, and 3 illustrate the sequence of use of the invention. Having already cocked the trap 7, trapper 8 places tool 9 over pan 10. Triggering dog 11 is not disturbed, and fits into first slot 12. Trap frame 13 fits snugly into at least one additional slot 14, thereby permitting trapper 8 to twist, push, slide or otherwise maneuver the trap into bedding material 15 therebelow, via handle member 17. As trap 7 is embedded in bedding material 15, enclosure member 16 prevents bedding material 15 from accumulating in the space beneath the pan 10.

While trapper 8 manipulates trap 7 by means of tool 9, the trapper's scent is kept at a distance from the trap, and trapper 8 is kept at a distance from the operative area of the jaws 19. As shown in FIG. 3, should trigger dog 11 be released, trap jaws 19 strike handle member 17 rather than trapper 8. Should trigger dog 11 remain latched, trapper 8 embeds trap 7 as much as possible, then covers trap 7 with bedding material 15. When trapper 8 removes tool 9 from trap 7, and lightly covers pan 10 with bedding material, the small amount of bedding material 15 which may slide under pan 10 will not be enough to appreciably degrade the trap's performance.

FIGS. 4, 5 and 6 illustrate a preferred embodiment of the invention. Enclosure member 16 is shaped in cross-section to match pan 10. First slot 12 is dimensioned to surround triggering dog 11 without disturbing it. At least one additional slot 14 engages trap frame 13. Handle member 17 is shown rigidly attached to enclosure member 16 by means of a thread 20. Handle member 17 could also be attached by other suitable means, such as a force fit or pivotal coupling.

In the embodiment of the invention depicted in FIG. 7, a threaded handle member 17 adjustably protrudes into and through a threaded enclosure member 16. In use, the protrusion contacts the pan of the trap, thereby allowing adjustment of the height of the pan. To precisely adjust the length of protrusion of the handle member, trapper 8 removes the tool from the trap, loosens lock nut 21, turns handle member 17 in threaded enclosure 22, then retightens lock nut 21. A less secure adjustment could be made without the use of lock nut 21; and, without locknut 21, the adjustment can be made while the tool is on the trap.

FIG. 8 discloses the use of the tool on a trap wherein the spring-loaded animal-holding means is a noose 24 rather than jaws. The operation of the noose trap is analagous to the operation of a jaw trap. In the noose trap, the animal is held by noose 24 against post 25, rather than between jaws. As previously described, the tool is adapted to overfit pan 10. First slot 12 loosely encloses and does not disturb triggering dog 11; and, at least one additional slot 14 securly engages frame 13.

The present invention may be embodied in other specific forms without departing from the spirit or essential attributes thereof, and accordingly, reference should be made to the appended claims, rather than to the foregoing specification as indicating the scope of the invention.

I claim:

1. A tool for handling cocked animal traps and the like, said traps of the type which operate by contact of an animal with a pan mounted on the frame of the trap, said contact causing release of a triggering dog, which allows operation of spring-loaded animal-holding means, said tool comprising:
   an enclosure member adapted to overfit the pan of the trap;
   a handle member for said enclosure member, said handle member having a length greater than the span of the jaws of the trap.

2. The tool of claim 1 further comprising:
   a first slot in said enclosure member, said first slt being large enough to loosely overfit the triggering dog of the trap.

3. The tool of claims 1 or 2 further comprising:
   at least one additional slot in said enclosure member, said at least one additional slot adapted to allow said enclosure member to fit snugly against the frame of the trap.

4. The tool of claim 3 wherein:
   said handle member may be removed from said enclosure member for interchangeable use with at least one additional enclosure member, said at least one additional enclosure member being adapted to overfit the pan of additional traps.

5. The tool of claim 3 wherein:
   said handle member is adjustably connected to said enclosure member by means of a threaded hole in said enclosure member, and a matching thread on said handle member,
   and said matching thread on said handle member is long enough to permit the lower end of said handle member to be brought into contact with the pan of the trap.

6. A method for handling cocked animal traps and the like, said traps of the type which operate by contact of an animal with a pan mounted on the frame of the trap, said contact causing release of a triggering dog, which allows spring-loaded animal-holding means, the method comprising the following steps:
   covering the pan, the triggering dog, and the space immediately below the pan;
   securely engaging the frame of the trap;
   manually manipulating the trap by means of a handle member extending beyond the reach of the jaws of the trap.

7. The method of claim 6 wherein:
   said manipulating comprises sliding, twisting and pushing said trap into underlying bedding material.

8. The method of claim 6 or 7 further comprising:
   removing said handle member from said enclosure member, and installing said handle member on an additional enclosure member adapted for at least one additional trap.

9. The method of claim 6 or 7 wherein:
   said covering step further comprises adjusting the height of the pan by contacting the pan with a threadably adjustable protrusion extending inside said enclosure member.

* * * * *